United States Patent [19]

Thirion de Briel

[11] 4,410,312

[45] Oct. 18, 1983

[54] SPEED CHANGE DEVICE

[76] Inventor: Jacques Thirion de Briel, 83, Rue du President Wilson, 92300 Levallois-Perret, France

[21] Appl. No.: 263,757

[22] Filed: May 14, 1981

Related U.S. Application Data

[63] Continuation of Ser. No. 65,729, Aug. 10, 1979, abandoned.

[30] Foreign Application Priority Data

Aug. 21, 1978 [FR] France .............................. 78 24276

[51] Int. Cl.³ .............................................. F16H 55/56
[52] U.S. Cl. ......................................... 474/13; 474/46
[58] Field of Search ..................... 474/8, 11, 13, 14, 46

[56] References Cited

U.S. PATENT DOCUMENTS

| 4,020,711 | 5/1977 | Woollard | 474/13 |
| 4,132,120 | 1/1979 | Fenart | 474/13 |
| 4,178,808 | 12/1979 | Bacher | 474/13 |

FOREIGN PATENT DOCUMENTS 907945 10/1962 United Kingdom ................. 474/46

Primary Examiner—Lawrence J. Staab
Attorney, Agent, or Firm—Charles E. Brown

[57] ABSTRACT

A speed change pulley of the type having a fixed flange, a movable flange and an annular, diaphragm spring urging the movable flange toward the fixed flange. The diaphragm spring has an outer peripheral Belleville spring portion bearing against the rim of the movable flange and radial fingers bearing on a fulcrum element connected axially to the shaft of the pulley and fixed for rotation therewith. Lugs integral with the free ends of the radial fingers fulcrum on part cylindrical portions on the fulcrum element. Edges parallel to the axis of the shaft of the pulley and integral with the fulcrum element are in engagement with the lugs for rotationally coupling the diaphragm spring to the fulcrum element. The lugs may be fixed to the ends of the radial fingers or in one piece therewith. The edges may define surface contact or line contact.

15 Claims, 13 Drawing Figures

U.S. Patent  Oct. 18, 1983  Sheet 1 of 2  4,410,312
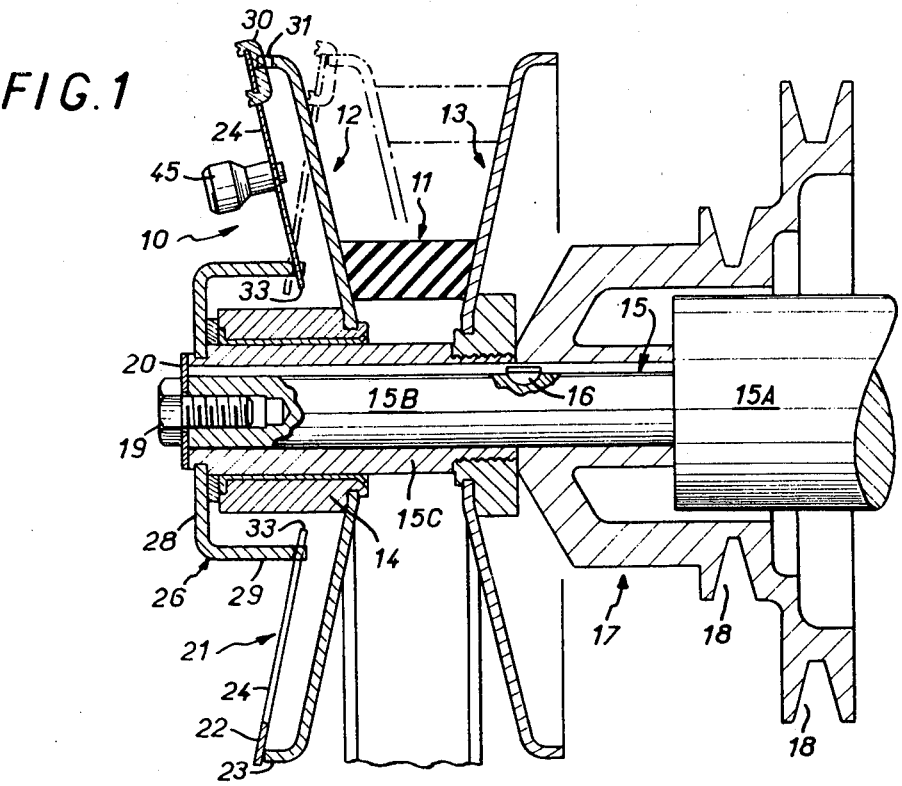
FIG.1
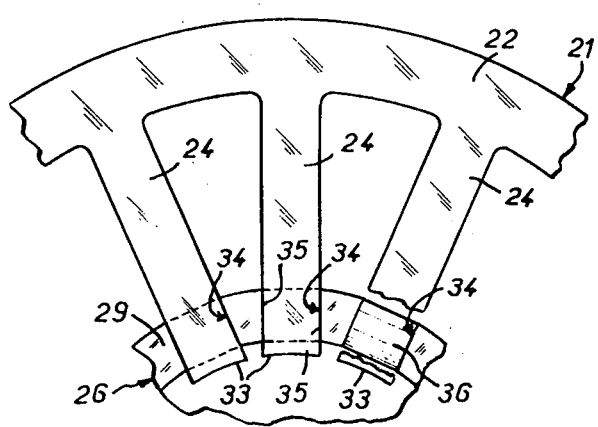
FIG.3
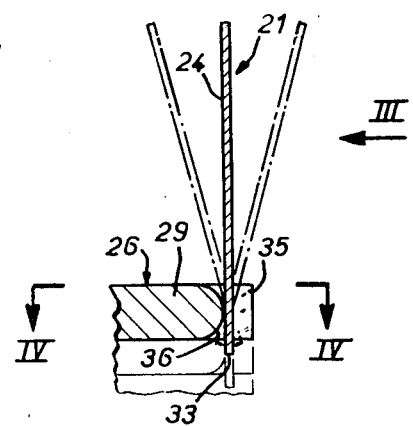
FIG.2
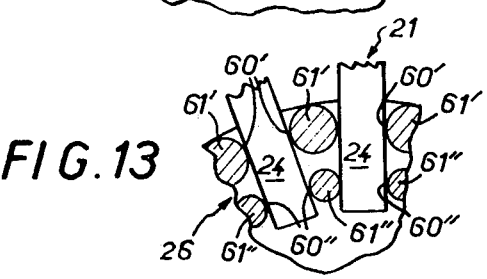
FIG.13
FIG.4

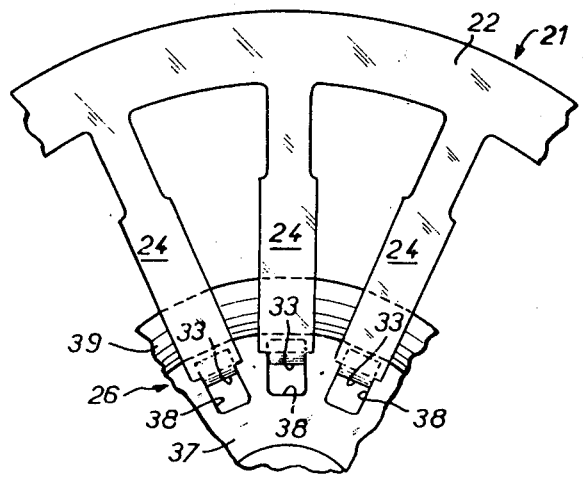
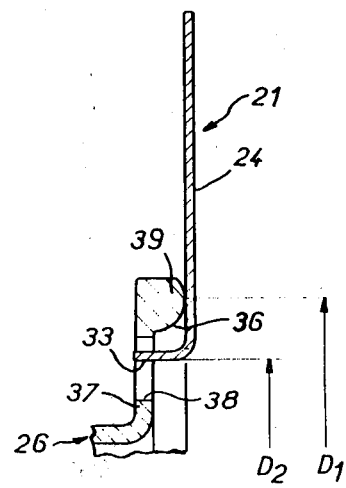
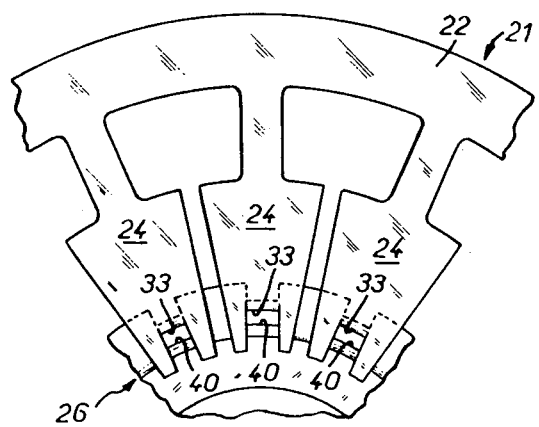
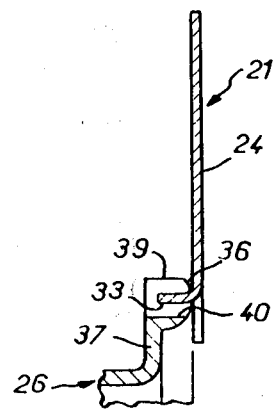
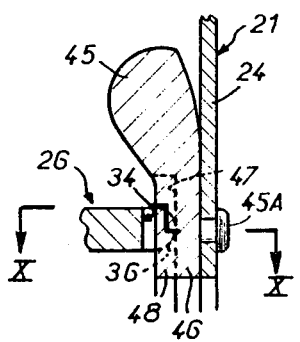
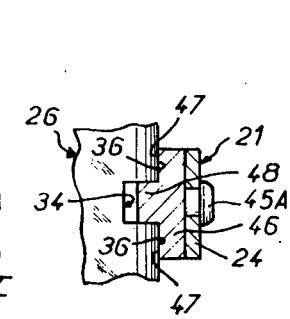
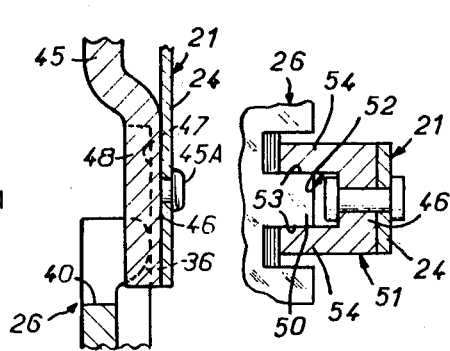

SPEED CHANGE DEVICE

This is a continuation of application Ser. No. 65,729, filed Aug. 10, 1979, now abandoned.

FIELD OF THE INVENTION

The present invention relates generally to speed change devices having a pair of variable pulleys associated by a belt susceptible of driving a device, and more particularly for use on motor vehicles for driving an accessory such as an alternator, a water pump or fan, typically found on such vehicles.

BACKGROUND OF THE INVENTION

As is known, such a speed change device comprises a drive pulley and a driven pulley and an endless drive belt. Each pulley comprises a pair of coaxial frustoconical flanges facing each other, namely a movable flange slidably mounted on and fixed for rotation with a shaft and a fixed flange which is not only fixed for rotation with the rotary shaft but also in operation connected axially thereto. Resilient return means urge the movable flange toward the fixed flange.

The present invention is more particularly concerned with such speed change devices in which the resilient return means of each pulley comprise an annular diaphragm spring having a conical or Belleville spring outer peripheral portion which bears axially against the movable flange of the pulley and a central part divided into a plurality of radial fingers by slots alternating therewith and fulcruming on a fulcrum element fixed axially to and for rotation with the shaft of the pulley.

Typically, lugs for coupling the fulcrum element for rotation with the diaphragm spring are provided.

In such present-day devices lugs for rotational coupling are carried by the fulcrum element and they are in engagement in the slots between adjacent pairs of fingers or in passages formed in the fingers themselves for this purpose. In either event they are in engagement with edges formed on the diaphragm spring parallel to the axis of the pulley.

Further, in such present-day devices, the circle on which the diaphragm spring fulcrums on the fulcrum element coincides with the circle on which the lugs for rotational coupling are located between the diaphragm spring and the fulcrum element.

Indeed in such known devices the fulcrum surface for the diaphragm spring on the fulcrum element is a toric surface common to all the radial fingers of the diaphragm spring.

Although such constructions have given satisfaction, they have various drawbacks as will be explained hereinafter.

First of all as the diaphragm spring fulcrums the fulcrum element in line with the lugs coupling the diaphragm spring for rotation with the fulcrum element, the passages through the radial fingers of the diaphragm spring in which the lugs are received inevitably reduce the surface on which the diaphragm spring effectively fulcrums on the fulcrum element.

Now, bearing in mind the relatively high axial load which develops between the diaphragm spring and the fulcrum surface it is important that the axial bearing surface of the diaphragm spring against the fulcrum element is as large as possible in order to minimize the wear at this location.

Furthermore, the radial fingers of the diaphragm spring are bowed and as they fulcrum on a common toric surface of the fulcrum element, the corresponding fulcrum surface for each radial finger is limited and varies depending on the inclination of such a radial finger relative to the axis of the toric fulcrum surface in the course of operation.

Moreover, in known arrangements in which the lugs on the fulcrum element are received in the slots defined between consecutive radial fingers, the width of the slots is caused to change in the course of operation thereby jeopardizing the centering of the diaphragm spring.

SUMMARY OF THE INVENTION

A general object of the invention is to overcome or at least partially eliminate the drawbacks of such prior art arrangements.

According to the invention there is provided a speed change device of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs for coupling said fulcrum element for rotation with said diaphragm spring being integral with said diaphragm spring and in circumferential engagement with edges integral with said fulcrum element and parallel to the axis of the pulley.

According to a preferred embodiment of the invention the fulcrum element has lug accommodating means integral with the diaphragm spring, said lug accommodating means being formed as a slot, notch, recess or depression. The circumferential sidewalls of the lug accommodating means defining the edges with which the lugs are in engagement for rotational coupling.

For example, the lug accommodating means in the fulcrum element may be formed on a generally axially extending portion of said fulcrum element, in which case the lugs extend generally radially, the lugs being formed on the radial fingers themselves or by parts fixed thereon. In either event the lugs are integral with the radial fingers.

Such a radial finger bears unintentionally on the fulcrum element. In other words the fulcrum surface for the diaphragm spring on the fulcrum element is maximized and the wear of this surface is advantageously minimized.

According to another embodiment of the invention the lug accommodating means on the fulcrum element are formed on a generally radial portion of the fulcrum element and the lugs extend generally axially, in which case the lugs are formed by right angle bends at the ends of the radial fingers of the diaphragm spring or by parts fitted thereon. Again in either event the lugs are effectively integral with the radial fingers.

As above, the diaphragm spring fingers bear uninterruptedly against the fulcrum element, the fulcrum circle along which the lugs bear and the fingers fulcrum, being different from the circle along which the lugs rotationally couple the diaphragm spring to fulcrum element.

Moreover, according to the invention, the fulcrum surface on the fulcrum element bears either directly or indirectly against the radial finger of the diaphragm spring and is preferably part cylindrical with its axis perpendicular to the radial plane through the center line of the finger.

In addition each radial finger is advantageously planar at least in the zone where it is adapted to be in contact with the part cylindrical fulcrum surface.

As a result in the course of operation the effective fulcrum surface for such a radial finger on the fulcrum element does not vary with changes of the inclination of the finger relative to the axis of the fulcrum surface on the fulcrum element in contact with it.

Additionally, according to the invention the edges with which the lugs cooperate are advantageously parallel to the radial plane through the center line of the corresponding finger which permits excellent centering of the diaphragm spring throughout operation.

In any event the term "edge" is to be taken broadly and may reduce to two lines lying in a plane.

These and other features and advantages of the invention will become apparent from the description which follows, given by way of example, with reference to the accompanying schematic drawings.

BRIEF DESCRIPTION OF THE DRAWINGS

FIG. 1 is a longitudinal sectional view of a variable pulley embodying the present invention;

FIG. 2 is an enlarged fragmentary view in longitudinal section of the diaphragm of the pulley of FIG. 1 with the associated fulcrum element, the diaphragm spring being assumed to be in a position in which it is substantially perpendicular to the axis of the pulley;

FIG. 3 is a partial elevational view of the diaphragm spring and the fulcrum element taken in the direction of arrow III of FIG. 2;

FIG. 4 is a fragmentary sectional view taken on line IV—IV in FIG. 2;

FIGS. 5 and 6 are views similar to those of FIGS. 2 and 3 for an alternative embodiment;

FIGS. 7 and 8 are also views similar to FIGS. 2 and 3 for a further embodiment;

FIG. 9 is a view similar to that of FIG. 2 for another alternative embodiment;

FIG. 10 is a fragmentary sectional view taken on line X—X in FIG. 9;

FIG. 11 is a view similar to that of FIG. 9 relative to another embodiment;

FIG. 12 is a view similar to that of FIG. 10 for still another embodiment; and

FIG. 13 is a view similar to FIG. 3 and relates to yet another alternative embodiment.

DETAILED DESCRIPTION OF PREFERRED EMBODIMENTS

In FIG. 1 only one of the pulleys of the pair of pulleys of a variable speed device is illustrated, here the driven pulley 10; likewise only part of the associated drive belt is shown, designated by reference numeral 11.

The pulley 10 comprises, two coaxial frustoconical flanges facing each other, namely a movable flange 12 urged by resilient return means axially relative to the other or fixed flange 13.

In the illustrated embodiment the movable flange 12 is mounted on a tubular hub 14 for sliding movement on a shaft 15.

The shaft 15 comprises a plurality of parts, namely, an axial part which is divided into two sections, i.e. a large diameter section 15A and a small diameter section 15B, and a peripheral part 150 defining a socket at one of the ends of which is secured the fixed flange 13.

The socket, which is received on the small diameter section 15B of the axial part of the shaft 15 and fixed for rotation therewith by means of a key 16, bears axially against the end of the hub 17 which in turn bears against the large diameter section 15A of the axial part of the shaft 15. The hub carries one or more pulleys 18 for driving an accessory e.g. an alternator.

A set screw 19 holds the socket 15C against the hub 17 through the intermediary of a washer 20.

Thus, not only is the fixed flange 13 keyed for rotation with the shaft 15 but it is in addition axially connected thereto.

The resilient return means which urges the movable flange 12 toward the fixed flange 13 comprise an annular, diaphragm spring 21 having a Belleville spring outer peripheral portion which bears axially against the movable flange 12, more specifically a rim 23 formed at the outer periphery of the movable flange, and a central portion which is divided into a plurality of radial fingers 24 and which axially bears against a fulcrum element 26 fastened to the socket 15 at the outer end thereof remote from the fixed flange 13. The fulcrum element 26 is therefore keyed for rotation with the shaft 15 and fixed axially thereto.

In the illustrated embodiment the fulcrum element 26 is generally cup-shaped including a generally radial endwall portion 28 of the cup bearing against the socket 15C and a generally axial portion 29 defining a cylindrical sidewall of the cup, the radial fingers 24 of the diaphragm spring 21 bearing on the rim of the cylindrical sidewall.

The movable flange 12 is rotatably driven via the diaphragm spring 21 by the fulcrum element 26. To this end the Belleville washer peripheral portion 22 of the diaphragm spring 21 carries protruding claws 30 in engagement with notches formed in the peripheral rim 23 of the movable flange 12 and in conjunction therewith are provided between the diaphragm spring 21 and the fulcrum element 26 lugs for rotational coupling carried by one of the fulcrum element 26 and diaphragm spring 21 the other of which carries circumferentially edges parallel to the axis of the pulley.

According to the invention the lugs are integral with the diaphragm spring 21 and the edges with which they cooperate integral with the fulcrum element 26.

In the preferred embodiment illustrated in FIGS. 1–4 these lugs are formed by the ends 33 of the radial fingers themselves; these lugs therefore extend generally radially. In conjunction therewith the axial sidewall portion 29 of the fulcrum element 26 comprises at its free end lug accommodating means 34 for receiving the lugs 33 individually and therefore the circumferential configuration is complementary to that of the lugs 33. In this embodiment the lug accommodating means are notches, but alternatively they may be recesses, slots, cup-shaped portions or depressions.

The lateral flanks 35 at the circumferential sides of such a lug accommodating means 34 therefore define the edges with which the lugs 33 are in engagement for rotationally coupling the diaphragm spring 21 to the fulcrum element 26, the lateral flanks 35 are parallel to the radial plane through the center line of the associated finger 24, thereby affording excellent centering of the diaphragm spring in the course of operation.

Further, in this embodiment each lug 33 bears directly against the end of the lug accommodating means 34 in which it is received and therefore the diaphragm 21 bears axially against the sides of the lug accommodating means 34 in the fulcrum element 26.

According to the invention the end of each such lug accommodating means is arranged and shaped as to individually form a fulcrum surface 36 for the corresponding lug 33. Preferably each fulcrum surface 36 is part cylindrical with its axis perpendicular to the radial plane through the center line of the corresponding radial finger, the corresponding lug 33 being formed at the associated end of the radial finger. The fulcrum element 26 may be stamped in a press to form such fulcrum surfaces 36. Furthermore the finger 24 is advantageously planar, at least in the fulcrum zone formed by the fulcrum surface 36.

Thus such a lug 33 fulcrums axially on the fulcrum element 26 along a continuous line along its entire circumferential extent of the lug regardless of the change in inclination or slope of the associated finger 24 of the diaphragm spring 21 in the course of service life of the pulley.

The operation of the variable pulley so constructed is moreover well known per se and therefore will not be described in detail herein; it will suffice to remind the reader that in the course of operation the movable flange 12 is displaced between two axial limit positions, one of which is shown in solid lines in FIG. 1 and the other shown in broken lines in the same figure.

According to the modified embodiment illustrated in FIGS. 5 and 6 the lugs 33 are, as before, formed by the ends of the radial fingers 24 themselves but in this embodiment they are bent at right angles so that the lugs extend generally axially toward the fulcrum element 26. In conjunction with this arrangement the lug accommodating means are formed at the free end of a generally radial endwall portion 37, and in the embodiment they are slots 38 formed radially in the radial endwall part 37 of the fulcrum element 26.

Of course, as above, the circumferential extension of each of the slots 38 is complementary to that of the lugs 33. Further, the edges of the slots 38 are parallel to the radial plane of the center line of the corresponding fingers.

In the illustrated embodiment of FIGS. 5 and 6 the radial part 37 of the fulcrum element 26 has an annular bead 39 at its outer periphery which protrudes axially and the radial fingers 24 of the diaphragm spring 21 fulcrum on the bead 39. As above, the bead 39 is so shaped that for each finger 24 of the diaphragm spring 21 is a fulcrum surface 36 formed as a part cylindrical portion with its axis perpendicular to the radial plane through the center line of the corresponding radial finger 24 which is preferably planar.

As will be noted there results from this arrangement that, as against the preceding embodiment, the fulcrum circumference or circle of diameter D1 along which the diaphragm spring 21 fulcrums axially on the fulcrum element 26 is different from the circle of diameter D2 along which the lugs 33 acts to afford the rotational coupling of the diaphragm spring with the fulcrum element.

In the illustrated embodiment of FIGS. 5 and 6 the diameter D1 is greater than the diameter D2 but the reverse situation may be adopted. In this event the lugs do not constitute the extremities of the radial fingers 24 but right angle tabs suitably fixed thereto short of their ends.

In the embodiment illustrated in FIGS. 7 and 8 the lugs 33 are formed by right angle bent cut-outs at the ends of the radial fingers 24, but as in the embodiment of FIGS. 1-4 the fingers 24 axially bear against the bearing element 26 along the same circumference or circle along which the lugs 33 act. The lug accommodating means 40 provided on the fulcrum element 26 comprise notches formed at the periphery of the radial endwall part 37 of the fulcrum element in line with the bead 39 formed in the middle of each fulcrum surface 36 of the bead.

The notches 40 have edges parallel to the radial plane through the center line of each finger 24. The fulcrum surface 36 is part cylindrical with its axis perpendicular to the finger 24. The finger 24 is advantageously planar.

In the foregoing description the radial fingers 24 fulcrum directly on the fulcrum element 26. However, according to a modified embodiment the fingers may act through parts fixed thereto. Such an arrangement is illustrated in FIGS. 9-12 in which the customary weight members 45 are used to increase the sensitivity of the diaphragm to centrifugal force. For example as shown, each of the weight members 45 may be carried on a small plate 46 by which it is mounted on the corresponding finger 24 which doubles the surface of the finger at least in the vicinity of the end thereof.

Shoulders 47 are formed on the plate 46 on each side of a central radially extending rib 48.

As regards FIGS. 9 and 10 we are dealing with an arrangement similar to that of FIGS. 1-4 since the ribs 48 of the plates 46 are received in notches 34 in the corresponding fulcrum element 26, while the shoulders 47 of this plate are in contact with fulcrum surfaces 36 formed to each side of such notches 34. Rivets 45A rivet the fulcrum element 45 to the fingers 24.

According to the modified embodiment of FIG. 11, which is similar to that described with reference to FIGS. 7 and 9 the plates 46 are received in the notches 40 of the corresponding fulcrum element 26 by the rib 48 while their shoulders 47 are, as above, in contact with the corresponding fulcrum surfaces 36.

In the foregoing, the plates 46 also advantageously comprise wear parts for the diaphragm spring and are therefore advantageously susceptible of accommodating the same. However, this is not necessarily the case. The diaphragm spring may indeed bear directly axially against the fulcrum element on each side of the plate 46 which in this case is reduced to a mere rib 48.

In the foregoing as regards the construction of the lugs required for coupling the diaphragm spring 21 for rotation with the fulcrum element 26 a female part is formed in each fulcrum element and a corresponding male part is formed on the diaphragm spring.

Alternatively, in FIG. 12, the arrangement is reversed; the fulcrum element 26 comprises for each finger 24 of the diaphragm 21 the lug accommodating means in the bearing element comprising tenons 50 which engage a bifurcated member 51 fixed to the finger 24. In the embodiment of FIG. 12 the bifurcated member 51 is formed by the plate 46 carrying the weight member associated with the related finger, the plate comprises for this purpose a radially extending groove 52 with which the associated tenon is in engagement.

Still, this bifurcated member 52 may also be formed directly on the finger 24 by means of tabs or wings cut out therefrom and bent, e.g. at right angles.

In any event the flanks 23 on the tenon 50 at its circumferential sides comprise edges with which the lugs 54 cooperate for rotational coupling, the lugs being formed by the branches of the bifurcated member 52.

As above, the edges 55 are parallel to the radial plane through the center line of the finger 24.

In the alternative embodiment illustrated in FIG. 13 which may be adapted to any other embodiment described with reference to FIGS. 1-4 and 9-12, the edges on the fulcrum element 26 are defined by pairs of lines 60', 60" lying in planes parallel to the axis of the pulley and formed on generatrices of cylindrical bosses 26 which are arranged in pairs at the same radial distance from the axis between consecutive radial fingers of the diaphragm spring. Thus in this embodiment coupling engagement is effected by pairs of line contact rather than surface contact of the preceding embodiments.

Of course the present invention is not limited to the described and illustrated embodiment but covers all modifications, alternatives and expedients and combinations thereof without departing from the spirit and scope of the invention.

Furthermore, as already mentioned, the features described and illustrated herein are equally applicable to the drive pulley of a speed change device and the driven pulley.

Also, the lug accommodating means in the bearing element do not necessarily traverse the bearing element as mentioned above and may be formed instead as blind recesses whether cup-shaped or otherwise.

What is claimed is:

1. A variable pulley of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs coupling said fulcrum element for rotation with said diaphragm spring being integral with said diaphragm spring and in circumferential engagement with edges integral with said fulcrum element and parallel to the axis of the pulley, said edges integral with said fulcrum element and portions on said lugs in torque transmitting relationship therewith being parallel to a radial plane through the center line of the associated finger of said diaphragm spring, said edges associated with each of said lugs defining at least two lines of contact with the associated portions of said lug, said at least two lines of contact lying in each of two planes parallel to the radial plane of the associated finger, and individual fulcrum surfaces on said fulcrum element for said radial fingers of said diaphragm springs, each said fulcrum surfaces being part cylindrical and having axes perpendicular to a radial plane through a center line of their associated fingers.

2. A variable pulley according to claim 1, wherein said edges integral with said fulcrum element are formed by lateral flanks thereof, and lug accommodating means being provided on said fulcrum element.

3. A variable pulley according to claim 2, wherein said lug accommodating means define slots integral with said fulcrum element.

4. A variable pulley according to claim 2, wherein said lug accommodating means comprise tenons receiving bifurcated members fixed to said fingers of said diaphragm spring, branches of said bifurcated members defining said lugs.

5. A variable pulley according to claim 2, wherein said lug accommodating means on said fulcrum element are formed on a generally axial part of said fulcrum element and said lugs extend generally radially.

6. A variable pulley according to claim 2, wherein said contact lines are parallel to the axis of the pulley, said lug accommodating means being formed by different diameter cylindrical bosses protruding axially from said fulcrum element and arranged in pairs along radii thereof, so that their generatrices in contact with the portions on the lugs define said portions.

7. A variable pulley according to claim 2, wherein said lug accommodating means on said fulcrum element are formed on a generally radial part of said fulcrum element and said lugs extend generally axially.

8. A variable pulley according to claim 1, wherein the diameter of the circle along which said diaphragm spring fulcrums is different from the circle on which said lugs couple said diaphragm spring to said fulcrum element.

9. A variable pulley according to claim 2, wherein said lug accommodating means define notches integral with said fulcrum element.

10. A variable pulley according to claim 2, wherein said lug accommodating means define recesses integral with said fulcrum element.

11. A variable pulley according to claim 1, wherein each said radial finger of said diaphragm spring is planar at least in its contact zone with said part cylindrical portion on said fulcrum element.

12. A variable pulley of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs for coupling said fulcrum element for rotation with said diaphragm spring being integral with said diaphragm spring in circumferential engagement with edges integral with said fulcrum element and parallel to the axis of the pulley, said edges integral with said fulcrum element and portions on said lugs in torque transmitting relationship therewith being parallel to a radial plane through the center line of the associated finger of said diaphragm spring, said lugs being defined by edge portions of said fingers, said edges integral with said fulcrum element being formed by axially extending lateral flanks thereof, said fulcrum element including a part cylindrical fulcrum surface extending between pairs of said lateral flanks, said lateral flanks and said fulcrum surfaces accommodating said edge portions of said fingers.

13. A variable pulley of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs for coupling said fulcrum element for rotation with said diaphragm spring being integral with said diaphragm spring and in in a circumferential engagement direction with edges integral with said fulcrum element and parallel to the axis of the pulley, said edges integral with said fulcrum element and portions on said lugs in torque transmitting relationship therewith being parallel to a radial plane through the center line of the associated finger of said diaphragm spring, said lugs being formed on members fixed to the radially inner end of said fingers, said fulcrum element having circumferentially spaced notches having radial flanks defining said edges integral with said fulcrum element, individual part cylindrical fulcrum surfaces for said fingers being disposed to each side of each of said notches in said fulcrum element, each of said lugs comprising a rib adapted to be accommodated in the associated notch, and shoulders to each side of said ribs for fulcruming against said fulcrum surfaces on said fulcrum element.

14. A variable pulley of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs for coupling said fulcrum element for rotation with said diaphragm spring being integral with said diaphragm spring and in engagement in a circumferential direction with edges integral with said fulcrum element and parallel to the axis of the pulley, said edges integral with said fulcrum element and portions on said lugs in torque transmitting relationship therewith being parallel to a radial plane through the center line of the associated finger of said diaphragm spring, said lugs being formed by branches of bifurcated members fixed to the radially inner ends of said fingers, lug accommodating means on said fulcrum element comprising tenons for receiving said bifurcated members, said edges integral with said fulcrum element being formed by the opposed sides of said tenons, and said portions of said lugs being formed by the facing sides of said branches of said bifurcated members, individual part cylindrical fulcrum surfaces engageable with the ends of said branches being formed on both sides of each of said tenons.

15. A variable pulley of the type comprising two coaxial frustoconical flanges facing each other, one of said flanges being a movable flange slidably mounted on and fixed for rotation with a rotary shaft and the other said flange being a fixed flange fixed for rotation with and connected at least in operation to said shaft, an annular diaphragm spring urging said movable flange toward said fixed flange and having a Belleville washer outer peripheral portion and a central portion divided into radial fingers fulcrumed on a fulcrum element fixed axially to said shaft and for rotation therewith, lugs for coupling said fulcrum element for rotation with said diaphragm spring being integral with said diaphragm spring and in engagement in a circumferential direction with edges integral with said fulcrum element and parallel to the axis of the pulley, said edges integral with said fulcrum element and portions on said lugs in torque transmitting relationship therewith being parallel to a radial plane through the center line of the associated finger of said diaphragm spring, lug accommodating means being provided on said fulcrum element comprising radially inner and outer pairs of cylindrical bosses protruding axially from said fulcrum element, said radially inner bosses being of smaller diameter than said radially outer bosses, said edges integral with said fulcrum element and in contact with said portions on said lugs comprising parts of generatrices on said inner and outer bosses lying in planes parallel to the radial plane of the associated finger.

* * * * *